(12) United States Patent
Chen et al.

(10) Patent No.: US 10,496,143 B2
(45) Date of Patent: Dec. 3, 2019

(54) FAN CONTROL METHOD

(71) Applicants: INVENTEC (PUDONG) TECHNOLOGY CORPORATION, Shanghai (CN); INVENTEC CORPORATION, Taipei (TW)

(72) Inventors: Zhao Chen, Shanghai (CN); Lian-Fei Zhang, Shanghai (CN); Dong-Rui Xue, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 37 days.

(21) Appl. No.: 15/870,803

(22) Filed: Jan. 12, 2018

(65) Prior Publication Data

US 2019/0163247 A1 May 30, 2019

(30) Foreign Application Priority Data

Nov. 30, 2017 (CN) .......................... 2017 1 1231826

(51) Int. Cl.
*F04D 27/00* (2006.01)
*G06F 1/20* (2006.01)
*H05K 7/20* (2006.01)
*G05D 23/24* (2006.01)
*G05B 11/42* (2006.01)

(52) U.S. Cl.
CPC .............. *G06F 1/206* (2013.01); *G05B 11/42* (2013.01); *G05D 23/24* (2013.01)

(58) Field of Classification Search
CPC ......... G06F 1/206; G05B 11/42; G05B 15/00; G05D 23/24
See application file for complete search history.

(56) References Cited

U.S. PATENT DOCUMENTS 9,207,732 B1 * 12/2015 Chen ........................ G06F 1/206
2013/0228632 A1 * 9/2013 Kapoor .............. G05D 23/1917
236/94
2016/0092616 A1 * 3/2016 Coutts ................. G06F 17/5009
703/2
2018/0032114 A1 * 2/2018 Hovis .................... G05B 15/02

* cited by examiner

*Primary Examiner* — Thomas C Lee
*Assistant Examiner* — Anzuman Sharmin
(74) *Attorney, Agent, or Firm* — Maschoff Brennan (57) ABSTRACT

A fan control method comprises: determining whether a processor power load value is larger than a load threshold, and generating a load determination result accordingly; determining whether a processor temperature is not larger than a temperature threshold, and generating a temperature determination result accordingly; choosing one set of PID coefficients from a plurality of sets of PID coefficients according to the load determination result and the temperature determination result; obtaining a temperature difference value related to the processor, and generating a first pulse width modulation value according to the temperature difference value and the set of PID coefficients; and calculating a second pulse width modulation value corresponding to an operation temperature, and obtaining a maximum of the first pulse width modulation value and the second pulse width modulation value to generate a fan control signal for controlling the fan.

8 Claims, 14 Drawing Sheets

FAN CONTROL METHOD

CROSS-REFERENCE TO RELATED APPLICATIONS

This non-provisional application claims priority under 35 U.S.C. § 119(a) on Patent Application No(s). 201711231826.9 filed in China on Nov. 30, 2017, the entire contents of which are hereby incorporated by reference.

TECHNICAL FIELD

This disclosure relates to a fan control method, and more particularly to an adaptive fan control method.

BACKGROUND

Ordinary portion-integration-differentiation (PID) speed control and linear speed control are usually adapted to traditional fan speed control strategy individually. However, the ordinary PID control does not allow a timely response when power consumption of a system component rapidly varies. As a result, the instantaneous temperature of said component may be over temperature. On the contrary, the linear speed control is poor in adaptability and wastes power

SUMMARY

In one or more embodiment of this disclosure, the fan control method is adapted to a mother board having a processor electrically connected to a fan for cooling the mother board. The fan control method comprises: determining whether a processor power load value is larger than a load threshold, and generating a load determination result accordingly; determining whether a processor temperature is not larger than a temperature threshold, and generating a temperature determination result accordingly; choosing one set of PID coefficients from a plurality of sets of PID coefficients according to the load determination result and the temperature determination result, wherein the set of PID coefficients at least includes a portion coefficient and a corresponding integration coefficient; obtaining a temperature difference value related to the processor, and generating a first pulse width modulation value according to the temperature difference value and the set of PID coefficients; and receiving an operation temperature of an electronic component on the mother board, calculating a second pulse width modulation value corresponding to the operation temperature, and comparing the first pulse width modulation value with the second pulse width modulation value for obtaining a maximum of the first pulse width modulation value and the second pulse width modulation value to generate a fan control signal for controlling the fan.

BRIEF DESCRIPTION OF THE DRAWINGS

The present disclosure will become better understood from the detailed description given herein below and the accompanying drawings which are given by way of illustration only and thus are not limitative of the present disclosure and wherein.

DETAILED DESCRIPTION

Figure 1:
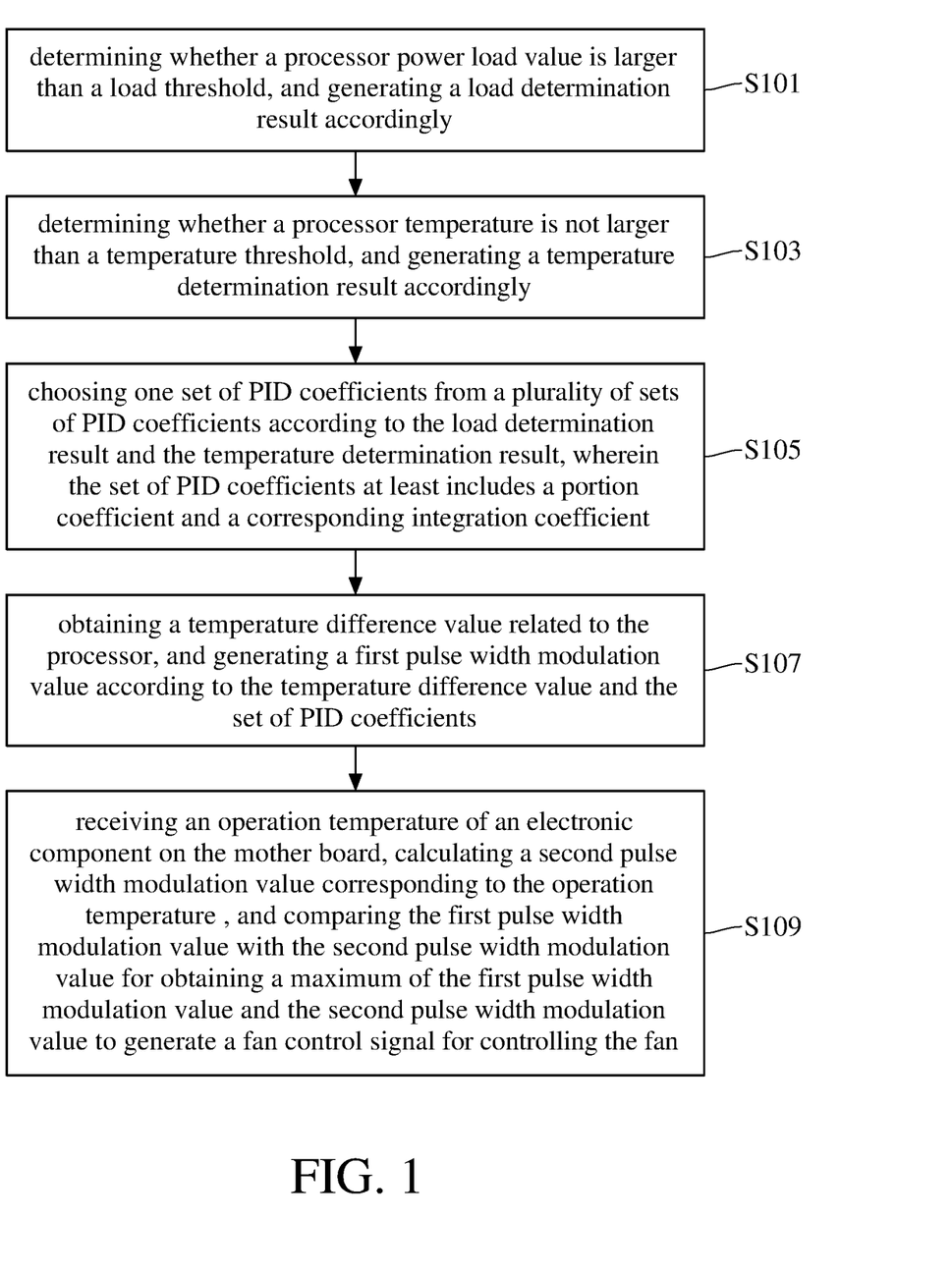
FIG. 1 is a flow chart of a fan control method in one embodiment of this disclosure.

Please refer to FIG. 1. FIG. 1 is a flow chart of a fan control method in one embodiment of this disclosure. The fan control method provided in this disclosure is adapted for a mother board. A processor is disposed on the mother board. The mother board is electrically connected to a fan for cooling the mother board. The fan control method provided in this disclosure can be implemented by a control chip on the mother board but is not limited thereto. As shown in FIG. 1, the fan control method comprises: in step S101, determining whether a processor power load value is larger than a load threshold, and generating a load determination result accordingly; in step S103, determining whether a processor temperature is not larger than a temperature threshold, and generating a temperature determination result accordingly; in step S105, choosing one set of PID coefficients from a plurality of sets of PID coefficients according to the load determination result and the temperature determination result, wherein the set of PID coefficients at least includes a portion coefficient and a corresponding integration coefficient; in step S107, obtaining a temperature difference value related to the processor, and generating a first pulse width modulation value according to the temperature difference value and the set of PID coefficients; and in step S109, receiving an operation temperature of an electronic component on the mother board, calculating a second pulse width modulation value corresponding to the operation temperature, and comparing the first pulse width modulation value with the second pulse width modulation value for obtaining the maximum of the first pulse width modulation value and the second pulse width modulation value to generate a fan control signal for controlling the fan.

In addition to the above steps, the fan control method provided in this disclosure further includes other steps. Please refer to FIG. 2 to FIG. 5 all together with FIG. 1. FIG.

Figure 4:
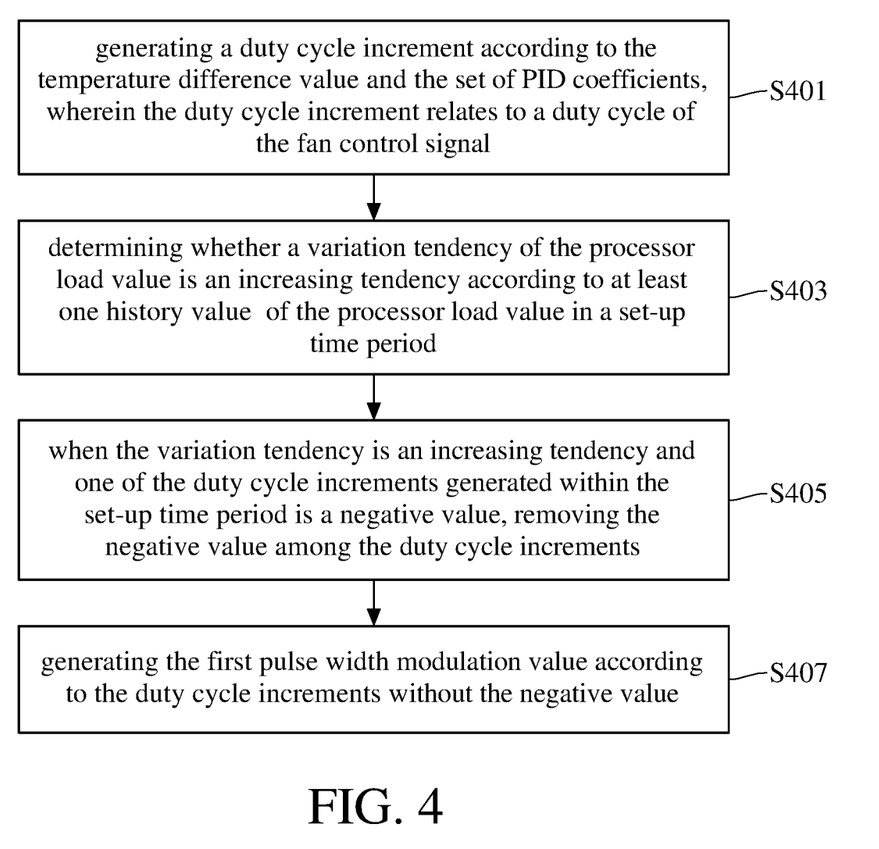
FIG. 4 is a flow chart of a part of steps of the fan control method in further another embodiment of this disclosure.
Figure 5:
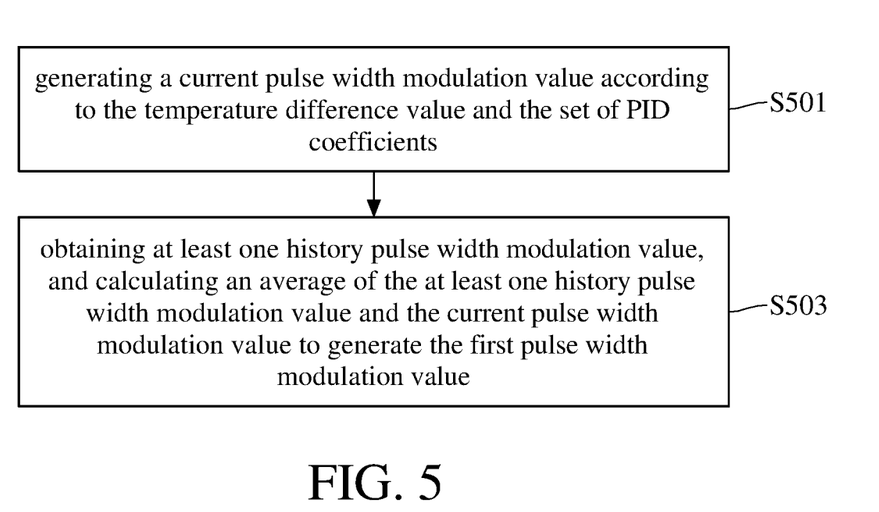
FIG. 5 is a flow chart of a part of steps of the fan control method in further another embodiment of this disclosure.

2 to FIG. 5 are flow charts of part of steps of the fan control method in different embodiments of this disclosure.

Figure 2:
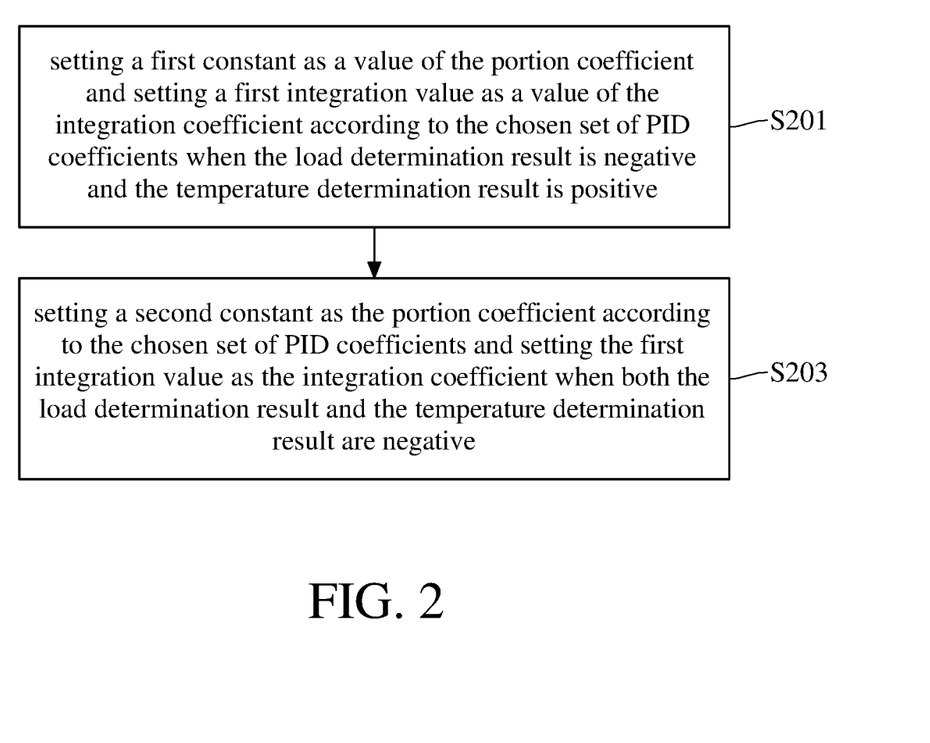
FIG. 2 is a flow chart of a part of steps of the fan control method in another embodiment of this disclosure.

As shown in FIG. 2, the following procedures are performed: in step S201, setting a first constant as a value of the portion coefficient and setting a first integration value as a value of the integration coefficient according to the chosen set of PID coefficients when the load determination result is negative and the temperature determination result is positive; in step S203, setting a second constant as the portion coefficient according to the chosen set of PID coefficients and setting the first integration value as the integration coefficient when both the load determination result and the temperature determination result are negative. The above mentioned first and second constants are different.

Figure 3:
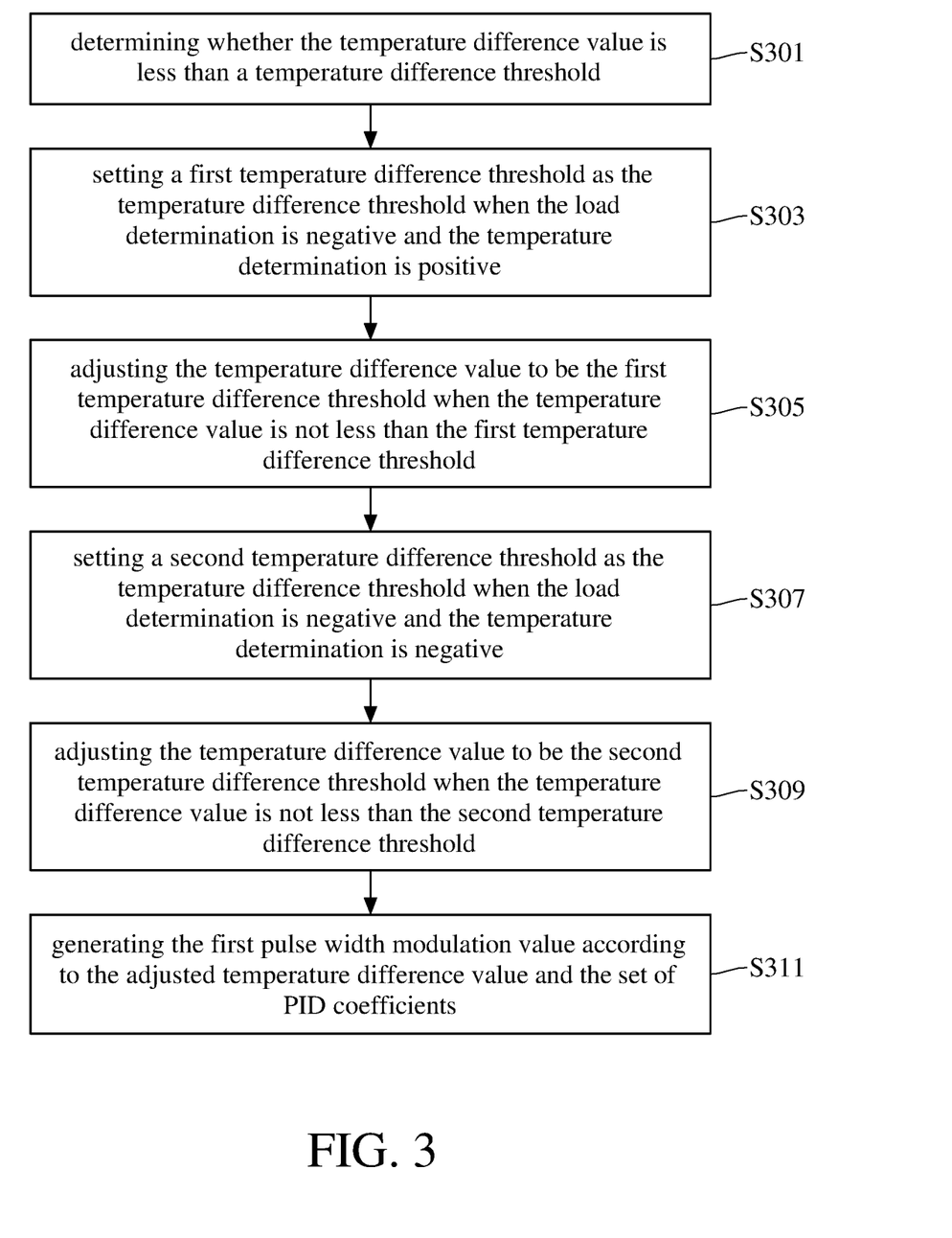
FIG. 3 is a flow chart of a part of steps of the fan control method in further another embodiment of this disclosure.

As shown in FIG. 3, the following steps are performed: in step S301, determining whether the temperature difference value is less than a temperature difference threshold; in step S303, setting a first temperature difference threshold as the temperature difference threshold when the load determination is negative and the temperature determination is positive; in step S305, adjusting the temperature difference value to be the first temperature difference threshold when the temperature difference value is not less than the first temperature difference threshold; in step S307, setting a second temperature difference threshold as the temperature difference threshold when the load determination is negative and the temperature determination is negative; in step S309, adjusting the temperature difference value to be the second temperature difference threshold when the temperature difference value is not less than the second temperature difference threshold; and in step S311, generating the first pulse width modulation value according to the adjusted temperature difference value and the set of PID coefficients.

As shown in FIG. 4, the following steps are performed: in step S401, generating a duty cycle increment according to the temperature difference value and the set of PID coefficients, wherein the duty cycle increment relates to a duty cycle of the fan control signal; in step S403, determining whether a variation tendency of the processor load value is an increasing tendency according to a plurality of history values of the processor load value in a set-up time period; in step S405, when the variation tendency is an increasing tendency and one of the duty cycle increments generated within the set-up time period is a negative value, removing the negative value among the duty cycle increments; and in step S407, generating the first pulse width modulation value according to the duty cycle increments without the negative value.

As shown in FIG. 5, the following steps are performed: in step S501, generating a current pulse width modulation value according to the temperature difference value and the set of PID coefficients; and in step S503, obtaining at least one history pulse width modulation value, and calculating an average of the at least one history pulse width modulation value and the current pulse width modulation value to generate the first pulse width modulation value.

Please refer to FIG. 6A to FIG. 6D together with the above figures. FIG. 6A to FIG. 6D are flow charts respectively corresponding to different parts of steps of the fan control method in further another embodiment of this disclosure. In practice, one or more processors may be disposed on the mother board, and the mother board exemplified in the embodiment shown in FIG. 6A to FIG. 6D has two processors.

Figure 6A:
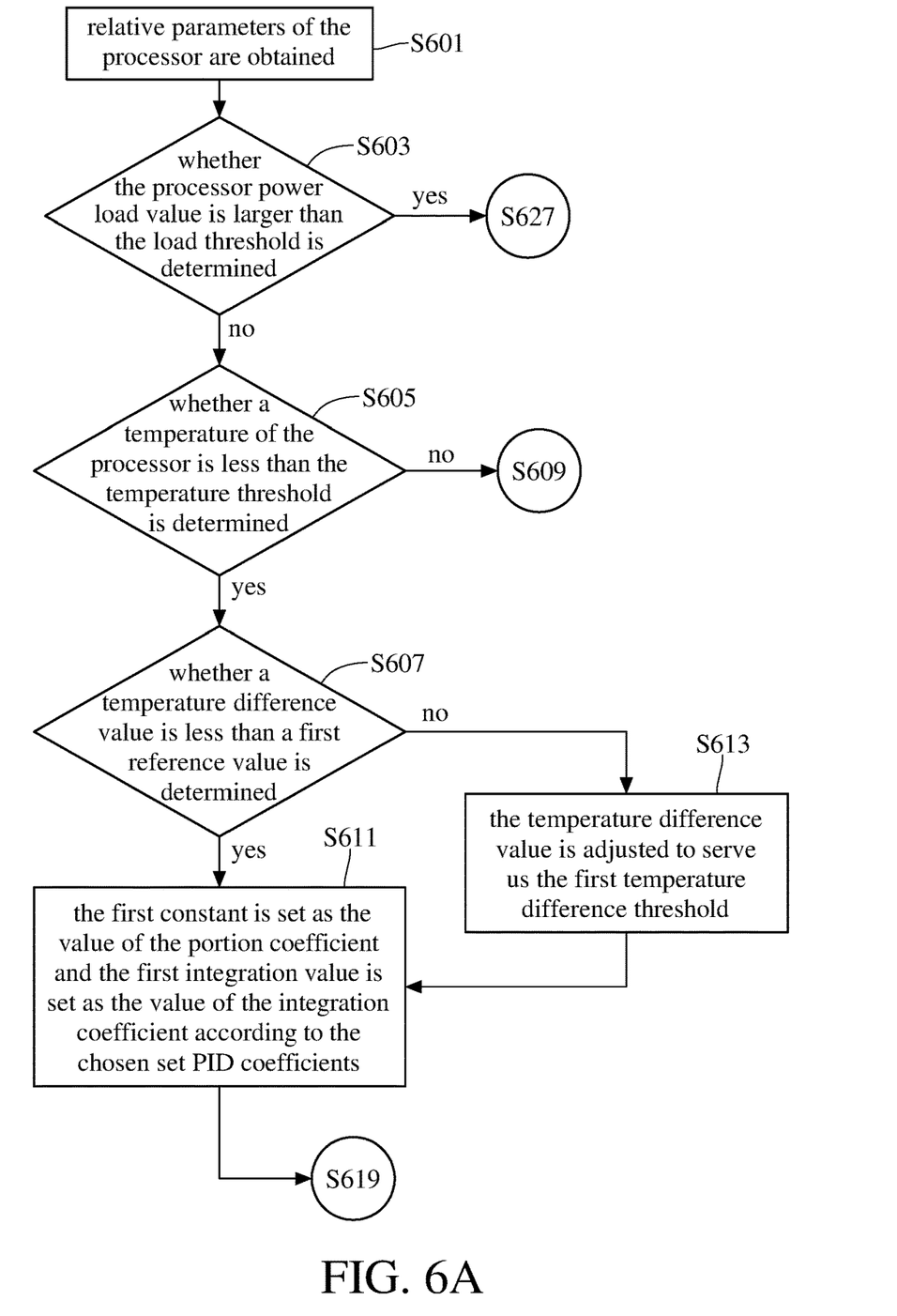
FIG. 6A is a flow chart of a part of steps of the fan control method in further another embodiment of this disclosure.

In step S601, relative parameters of the processor are obtained. Said parameters may be a current processor power load value, a rated power and a temperature value of the processor, but they are not thus limited thereto.

In step S603, whether the processor power load value is larger than the load threshold is determined. Said load threshold can be the rating power of the processor multiplied by a rating factor. In this embodiment, the load threshold is, for example, the rating power of the processor multiplied by 0.92. Step S605 is performed when the processor power load value of any of the two processors is not larger than the load threshold; otherwise, step S627 is performed instead.

In step S605, whether a temperature of the processor is less than the temperature threshold is determined. The temperature threshold is, for example, an operation temperature upper bound plus or minus a corresponding compensation value. In this embodiment, said temperature threshold is, for example, the operation temperature upper bound plus 5 degrees (in Celsius). Step S607 is performed when the temperature of the processor is less than the temperature threshold. Step S609 is performed when the temperature of the processor is not less than the temperature threshold.

In step S607, whether a temperature difference value is less than a first reference value is determined. In practice, the temperature difference value can be the difference between the current processor temperature and a history temperature. Said history temperature is, for example, the processor temperature at a time instant earlier than the current time instant for a default time period. In this embodiment, the temperature difference value is, for example, the difference between the current processor temperature and the processor temperature one second ago. The first reference value can be 5 degrees in Celsius. Step S611 is performed when the temperature difference value is less than the first reference value. Step S613 is performed when the temperature difference value is not less than the first reference value.

In step S609, whether a temperature difference value of said processor is less than a second reference value is determined. Details of the temperature difference value are similar to the previous description and thus are not repeated. In this embodiment, the second reference value is, for example, 10 degrees in Celsius. Step S615 is performed when the temperature difference value is less than the second reference value. Step S617 is performed when the temperature difference value is not less than the second reference value.

Figure 6B:
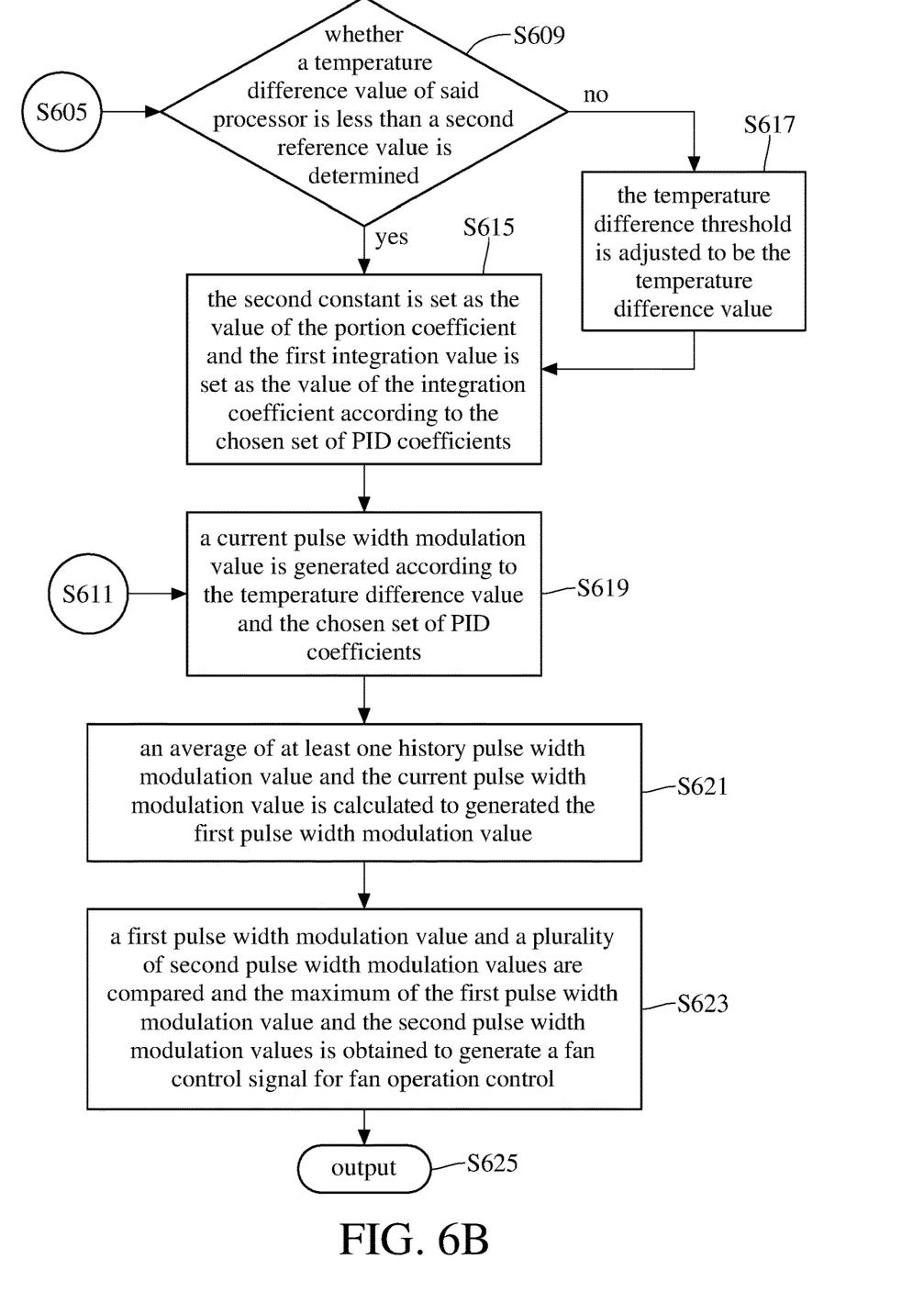
FIG. 6B is a flow chart of another part of steps of the fan control method in said further another embodiment of this disclosure.

In step S611, the first constant is set as the value of the portion coefficient and the first integration value is set as the value of the integration coefficient according to the chosen set PID coefficients. In this embodiment, the first constant is 3.5 and the first integration value is 0.5.

In step S613, the temperature difference value is adjusted to serve as the first temperature difference threshold.

In step S615, the second constant is set as the value of the portion coefficient and the first integration value is set as the value of the integration coefficient according to the chosen set of PID coefficients, wherein the first constant is different from the second constant. In this embodiment, the second constant is 2.

In step S617, the temperature difference threshold is adjusted to be the temperature difference value.

In step S619, a current pulse width modulation value is generated according to the temperature difference value and the chosen set of PID coefficients.

In step S621, an average of at least one history pulse width modulation value and the current pulse width modulation value is calculated to generate the first pulse width modulation value. Said history pulse width modulation value is, for example, another current pulse width modulation value calculated previously. Averaging calculation based on the current pulse width modulation value and two history pulse width modulation values is exemplified in this embodiment, but the number of history pulse width modulation value utilized in the average calculation is not limited thereto.

In step S623, a first pulse width modulation value and a plurality of second pulse width modulation values are compared and the maximum of the first pulse width modulation value and the second pulse width modulation values is obtained to generate a fan control signal for fan operation control. Said second pulse width modulation values are, for example, respectively related to pulse width modulation values corresponding to power of electronic components on the mother board except for the processor. Said electronic components may be NVMe interface, memory or hard drive but is not limited thereto.

The pulse width modulation value chosen in step S623 is outputted to a power module to generate corresponding pulse width modulation signal serving as the fan control signal while proceeding to step S625 from step S623. In one embodiment, said fan control signal is a pulse width modulation signal and said pulse modulation value can be a duty cycle increment related to the duty cycle of the fan control signal. In another embodiment, whether a variation tendency of the processor load value is an increasing tendency is determined according to at least one history value within a set-up time period. When the variation tendency is an increasing tendency and one of the duty cycle increments generated within the set-up time period is a negative value, the negative value is removed. The first pulse width modulation value is generated according to the duty cycle increments without the negative value. In one example, the current processor power consumption and the processor power consumption (or overall power consumption of the system) obtained at a former instant (one second previously for example) are compared when the processor power consumption (or overall power consumption of the system) is larger than a setting value. The variation tendency of the power consumption (or overall power consumption of the system) is determined as being an increasing tendency and corresponding process is performed when the current processor power consumption (or overall power consumption of the system) is larger than the processor power consumption (or overall power consumption of the system) obtained at the former instant.

Please go back to step S603 in FIG. 6A. As mentioned previously, step S627 is performed when the processor power load value of either one of the two processor is larger than the load threshold.

Figure 6C:
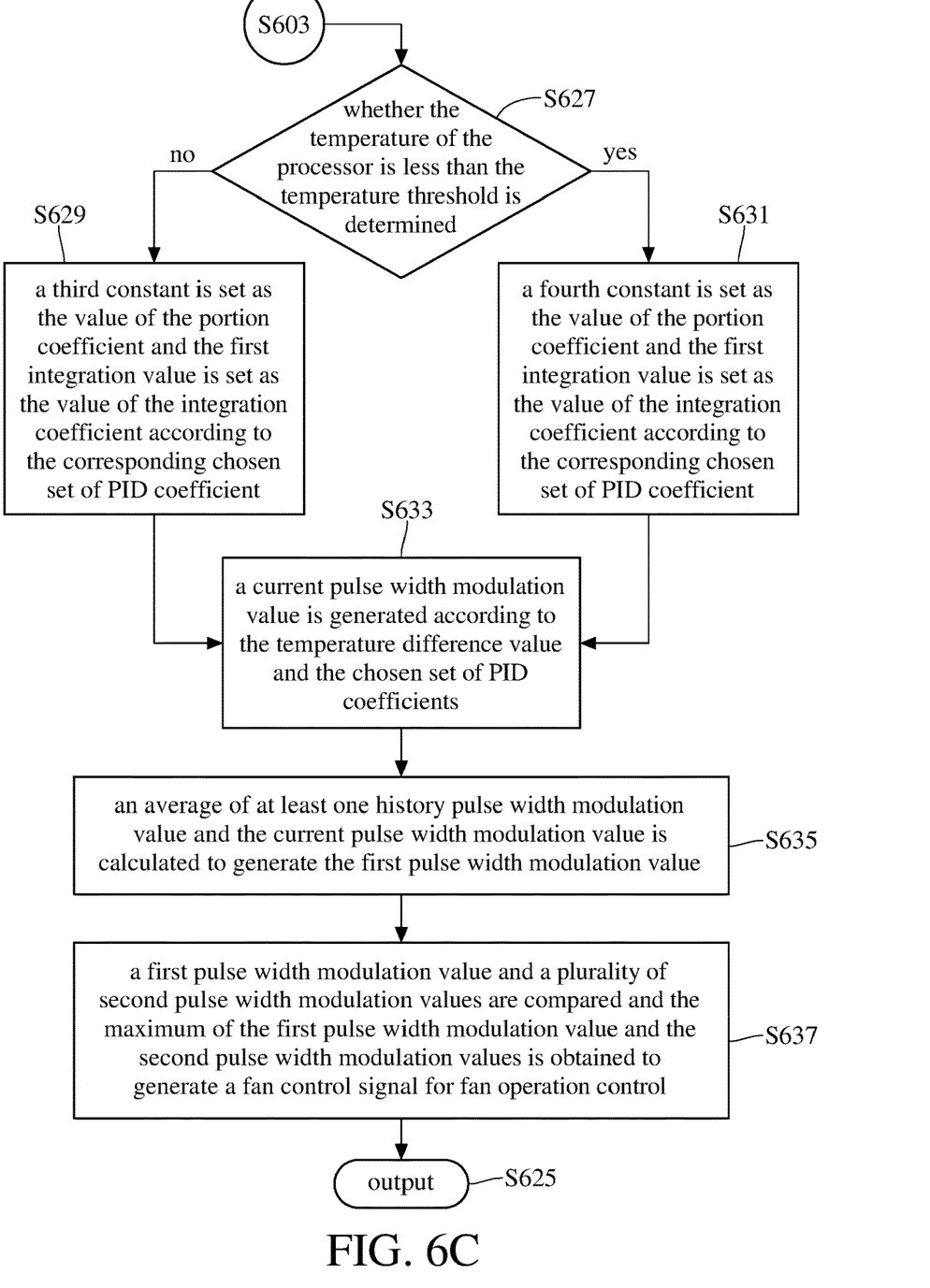
FIG. 6C is a flow chart of the other part of steps of the fan control method in said further another embodiment of this disclosure.

Please refer to FIG. 6C in the next. In step S627, whether the temperature of the processor is less than the temperature threshold is determined. Details about the parameters are similar to the description related to step S605 and are not repeated. Step S631 is performed when the temperature of the processor is determined as being less than the temperature threshold in step S631. Step S629 is performed when the temperature of the processor is determined as being not less than the temperature threshold.

In step S629, a third constant is set as the value of the portion coefficient and the first integration value is set as the value of the integration coefficient according to the corresponding chosen set of PID coefficient. In this embodiment, the third constant is 2 but is not limited thereto.

In step S631, a fourth constant is set as the value of the portion coefficient and the first integration value is set as the value of the integration coefficient according to the corresponding chosen set of PID coefficient. In this embodiment, the fourth constant is 6 but is not limited thereto.

In step S633, a current pulse width modulation value is generated according to the temperature difference value and the chosen set of PID coefficients.

In step S635, an average of at least one history pulse width modulation value and the current pulse width modulation value is calculated to generate the first pulse width modulation value. The details about the generation of the first pulse width modulation value are similar to the description about step S621 and are not repeated.

In step S637, a first pulse width modulation value and a plurality of second pulse width modulation values are compared and the maximum of the first pulse width modulation value and the second pulse width modulation values is obtained to generate a fan control signal for fan operation control. Details about step S637 is similar to step S623 and is not repeated.

The pulse width modulation value chosen in step S637 is outputted to the power module to generate corresponding pulse width modulation signal for serving as the fan control signal while the procedure turns to step S625 from step S637.

Figure 6D:
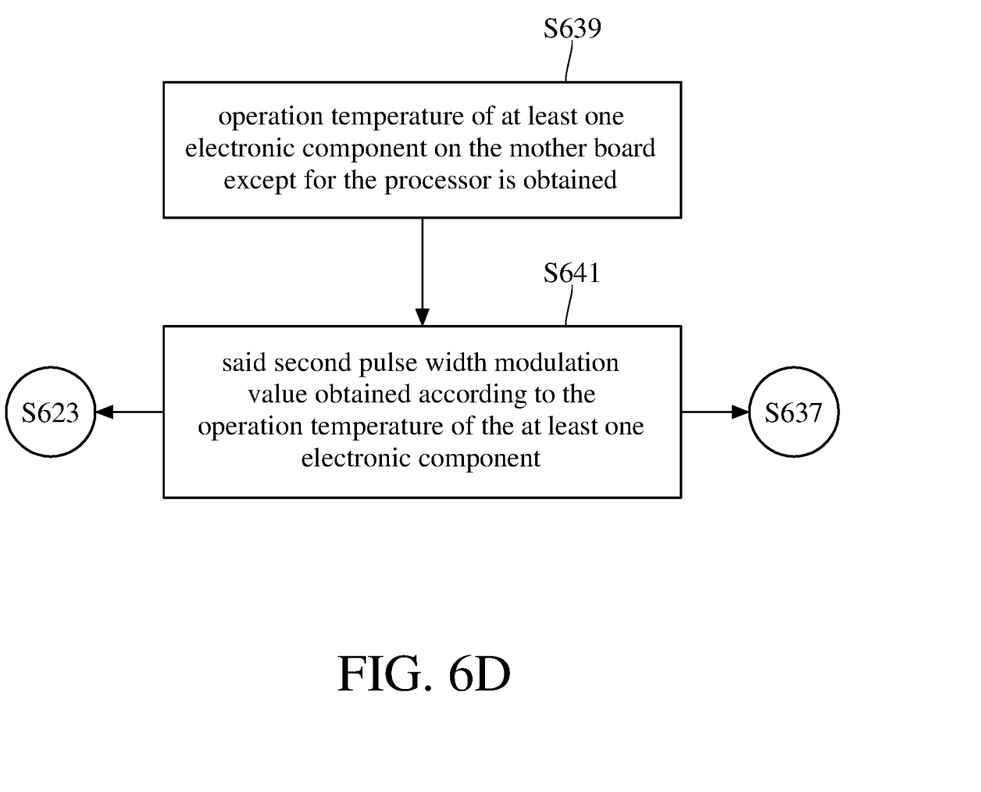
FIG. 6D is a flow chart of the other part of steps of the fan control method in said further another embodiment of this disclosure.

Step S639 and S641 are also disclosed in FIG. 6D. In step S639, operation temperature of at least one electronic component on the mother board except for the processor is obtained. In step S641, according to the operation temperature of the at least one electronic component, said second pulse width modulation value is obtained for step S623 and step S637.

Figure 7A:
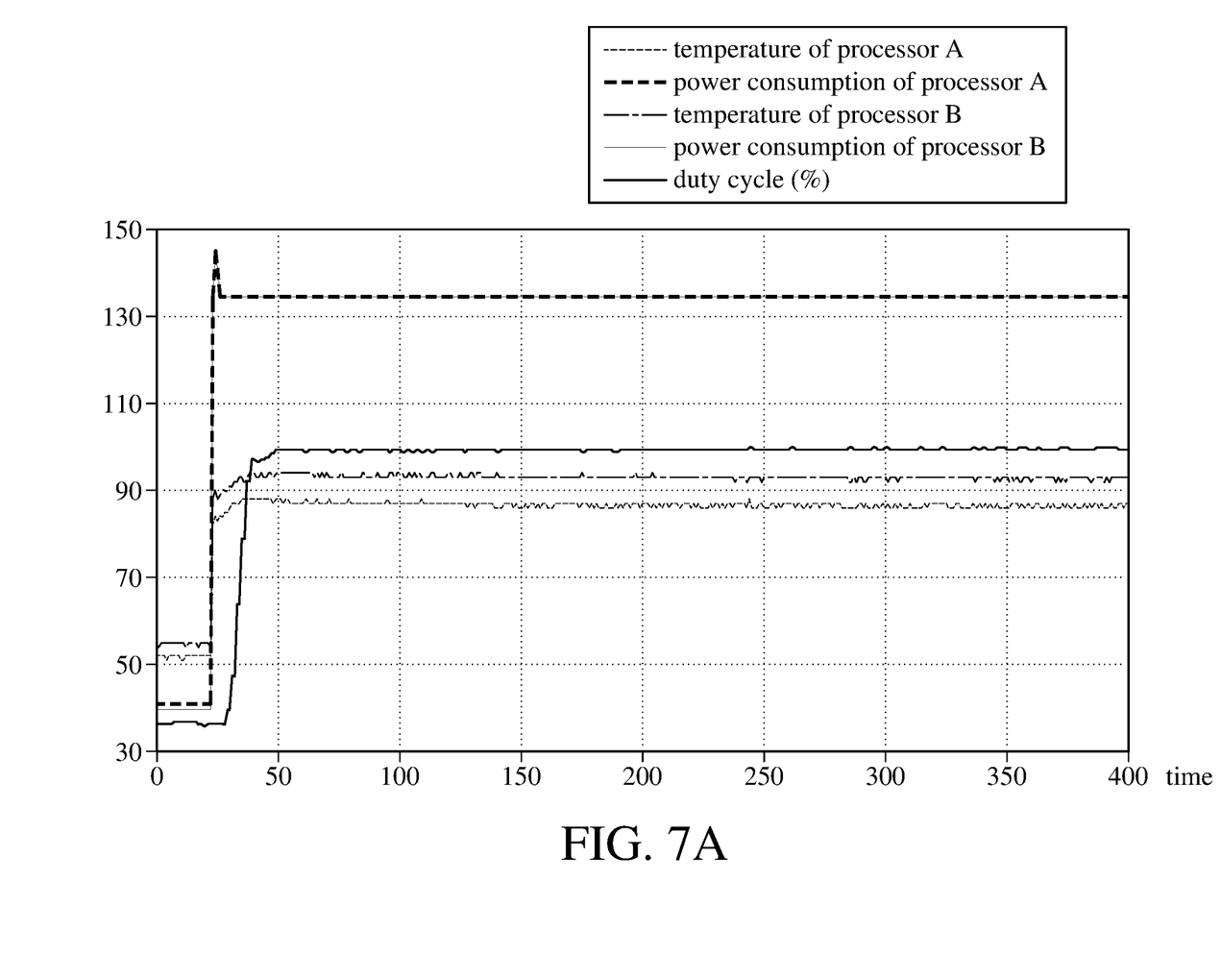
FIG. 7A is an experiment result diagram of the fan control method in one embodiment of this disclosure.
Figure 7B:
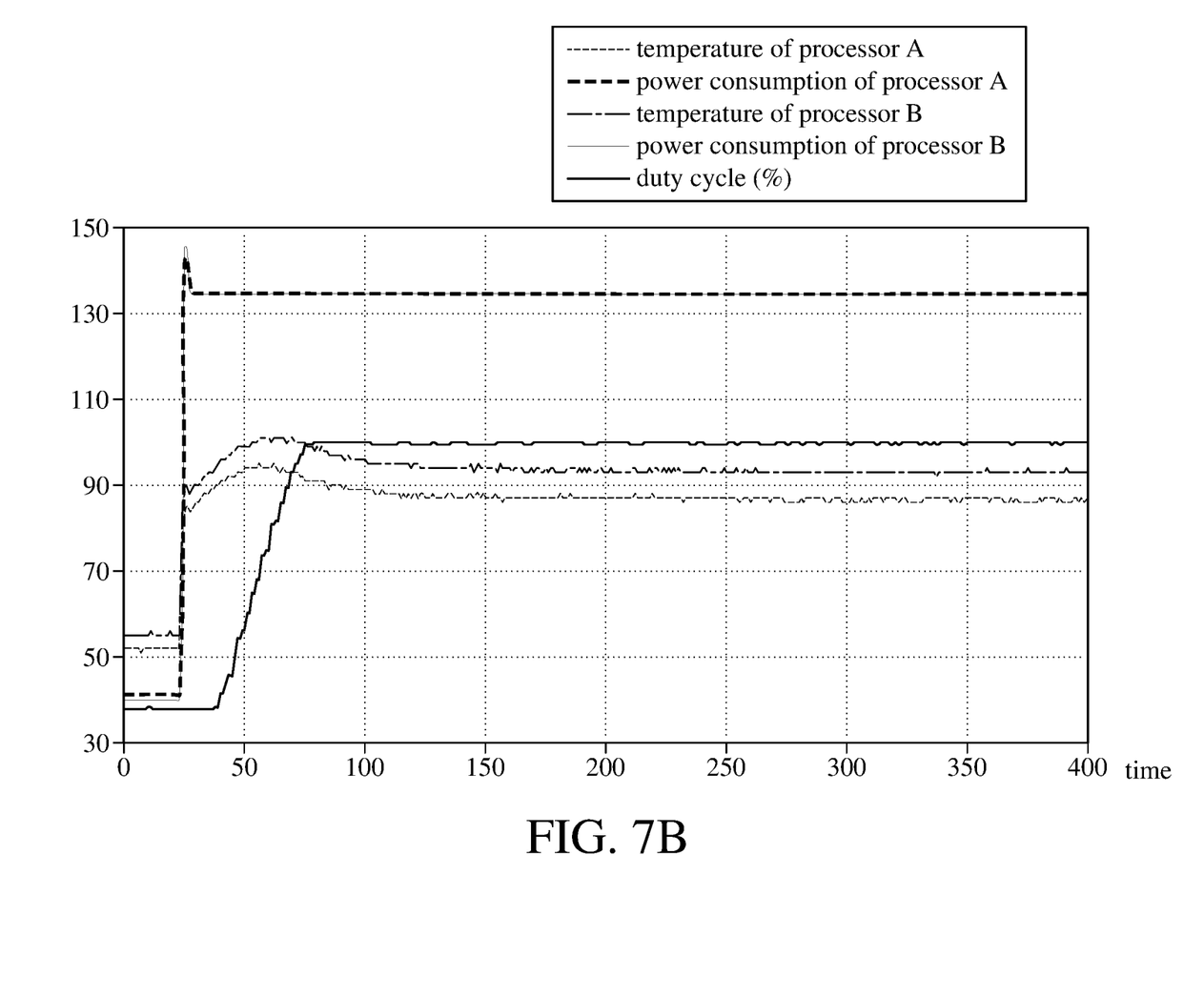
FIG. 7B is an experiment result diagram of the fan control method in one contrary embodiment of this disclosure.
Figure 7C:
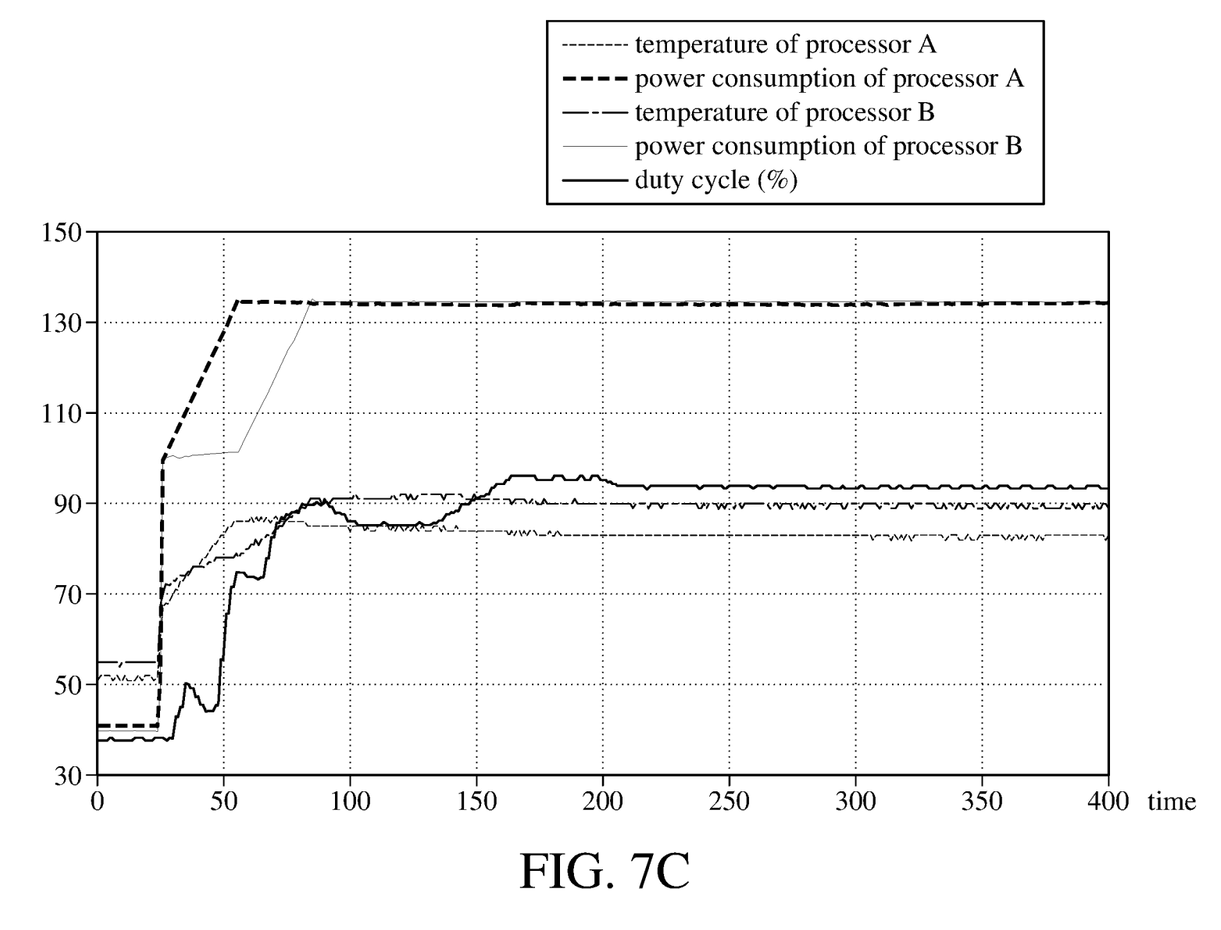
FIG. 7C is an experiment result diagram of the fan control method in another embodiment of this disclosure.
Figure 7D:
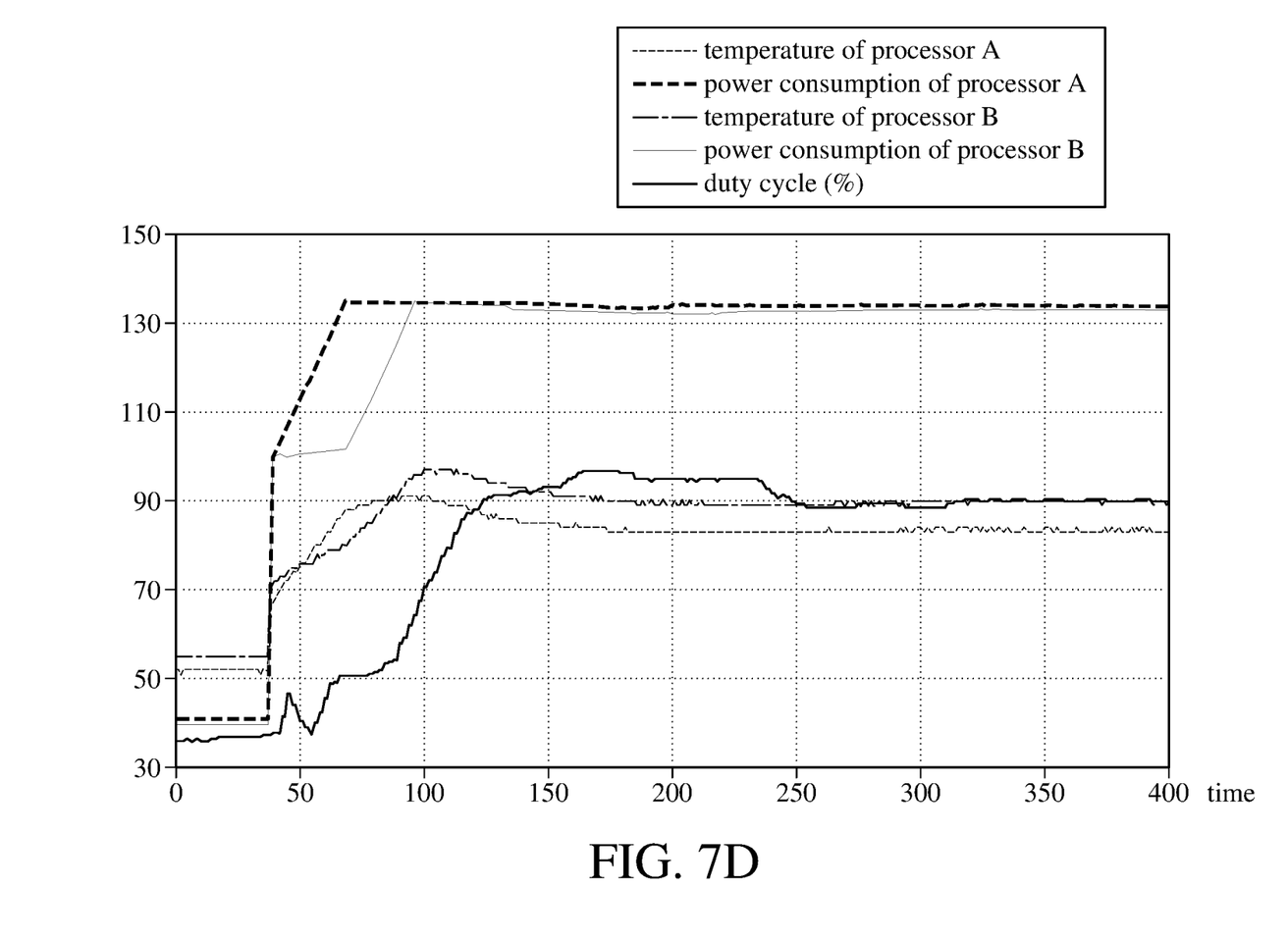
FIG. 7D is an experiment result diagram of the fan control method in another contrary embodiment of this disclosure.
Figure 7E:
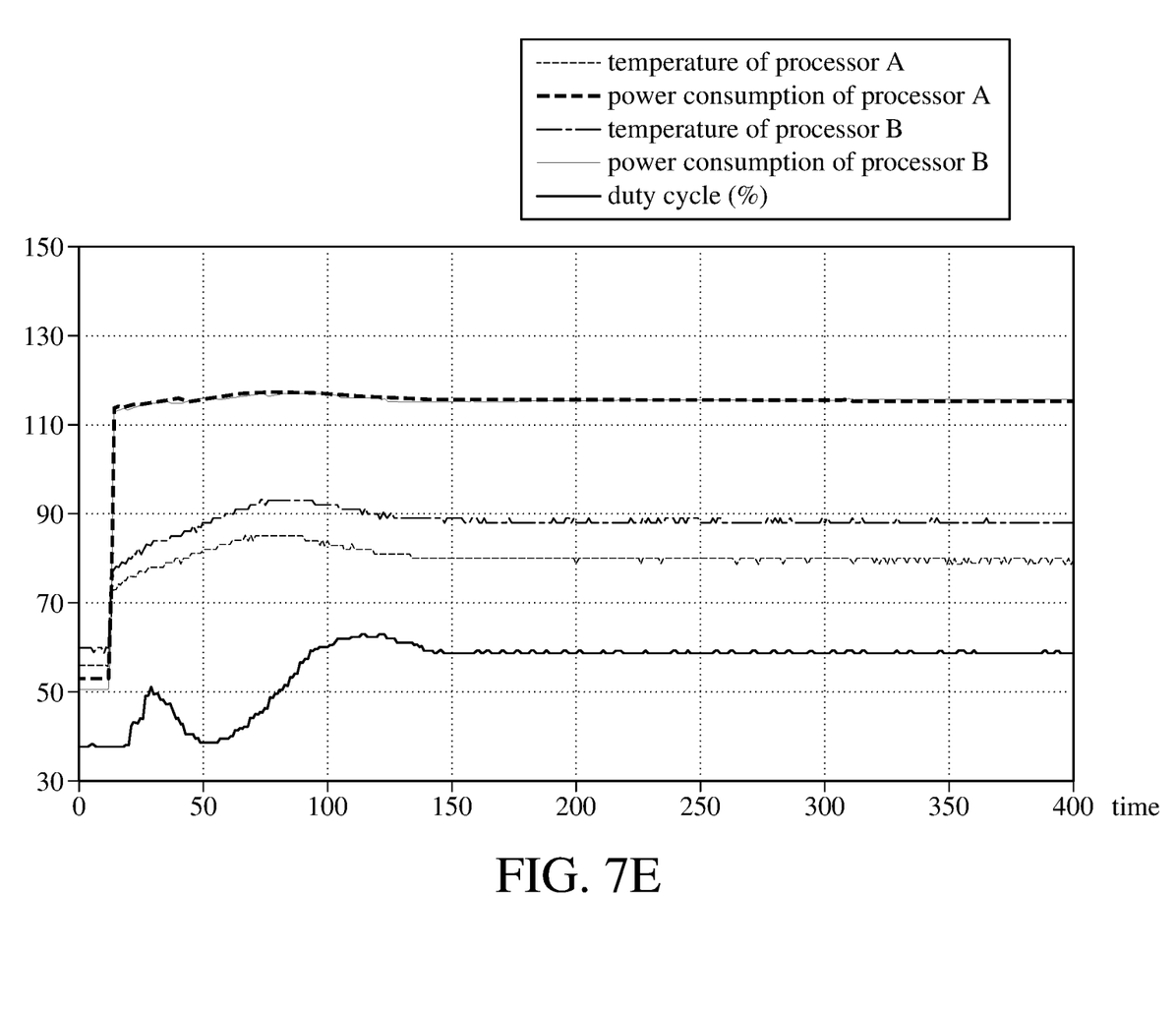
FIG. 7E is an experiment result diagram of the fan control method in further another embodiment of this disclosure.
Figure 7F:
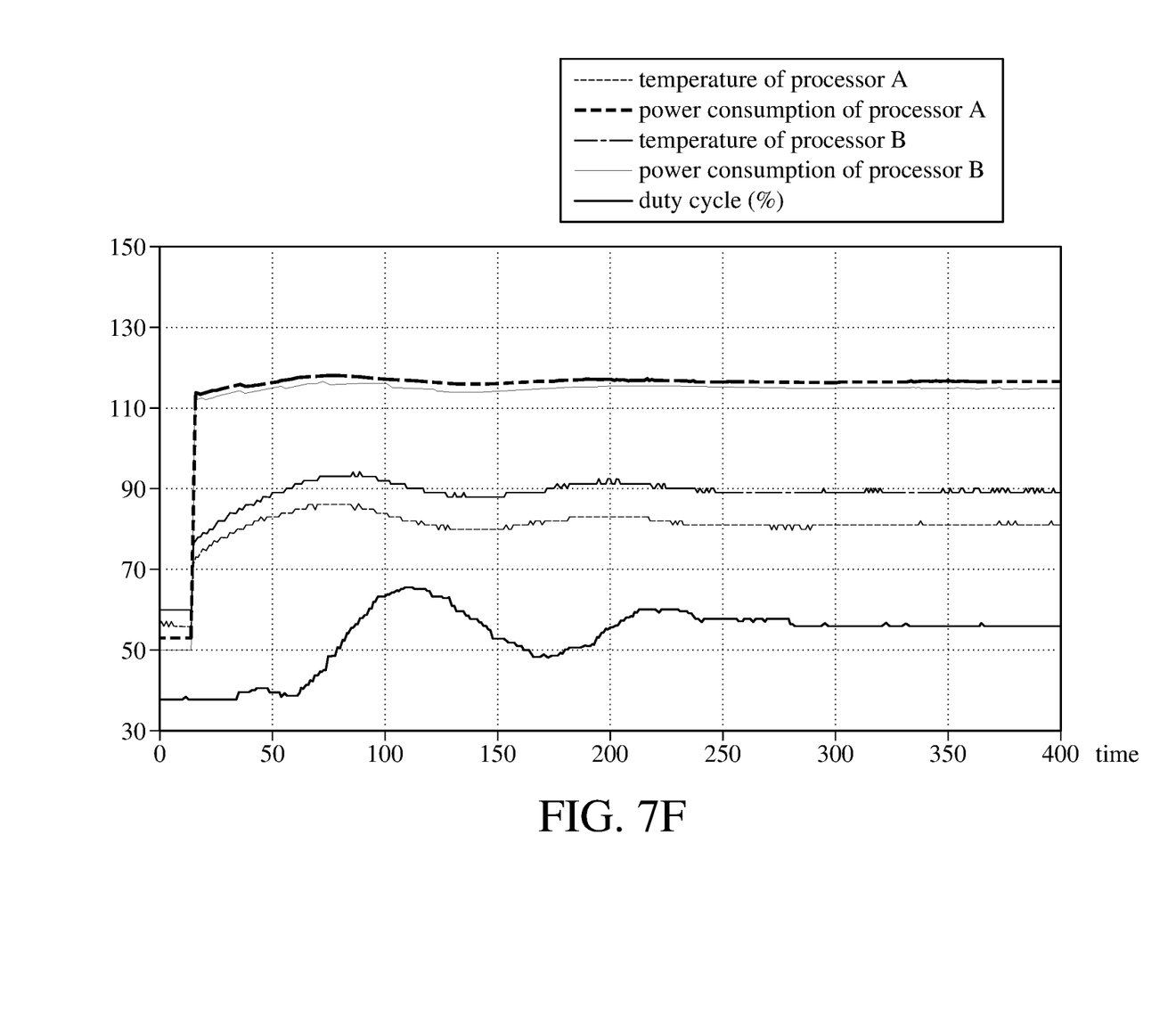
FIG. 7F is an experiment result diagram of the fan control method in further another contrary embodiment of this disclosure.

Please further refer to FIG. 7A to 7F. FIG. 7A is an experiment result diagram of the fan control method in one embodiment of this disclosure. FIG. 7B is an experiment result diagram of the fan control method in one contrary embodiment of this disclosure. FIG. 7C is an experiment result diagram of the fan control method in another embodiment of this disclosure. FIG. 7D is an experiment result diagram of the fan control method in another contrary embodiment of this disclosure. FIG. 7E is an experiment result diagram of the fan control method in further another embodiment of this disclosure. FIG. 7F is an experiment result diagram of the fan control method in further another contrary embodiment of this disclosure. A mother board disposed a processor A and a Processor B is adapted for experiments of the embodiments in FIG. 7A to 7F. For comparison, the curves respectively corresponding to temperature, power and duty cycle are depicted altogether in each one of FIG. 7A to 7F. As a result, the units of the vertical axes of the figures are not specifically marked to avoid confusing. Take an example for clear understanding, the vertical axis corresponding to the temperature curves represent temperature values with a unit of Celsius and the vertical axis corresponding to the power curves represent power values with a unit of watt (W) while the vertical axis corresponding to the duty cycle curves represents their duties in percentage (%) and is unit free. In one embodiment, the unit of the horizontal axis is second. The above description for units are for clear understandings only and this disclosure is not limited thereto.

The test item in FIGS. 7A and 7B is about the rapidly raised temperature of the processor till an operation temperature upper bound, which may be caused by the rapidly raised power consumption of the processor, so as to verify the difference between the performances of the fan control method provided in this disclosure and the prior art. FIG. 7A is corresponding to the fan control method provided in this disclosure. FIG. 7B is corresponding to the prior art. By FIG.

7B, the curve of the temperature of the processor has an obvious peak between the respond time 30 to 100. The peak value exceeds the steady state a lot and is close to a system alarm temperature value Tjmax. Said system alarm temperature value Tjmax is, for example, the highest temperature that the processor can normally operate. The processor is forced to underclock for lowering the temperature of the processor when the temperature of the processor is larger than the system alarm temperature value Tjmax. Moreover, in FIG. 7B, the response time of the fan is relatively long and the response speed is relatively slow, inducing the heat dissipation of components being too slow to lower the temperature and the components are over heated. As shown in FIG. 7A, the curve of the temperature of the processor has no obvious peak and is finally stable at a desired target value under the fan control method provided in this disclosure. Besides, the performances of the method in this disclosure about the response time and the response speed surpass the prior art. In other words, the fan control method provided in this disclosure can avoid components being over heated due to rapidly raised temperature when the power consumption varies rapidly.

The test item in FIGS. 7C and 7D is about the responses to the following situation: raising the power consumption rapidly in the beginning and then raising the power consumption slowly in the subsequence for gradually raising the temperature of the processor. As shown in FIG. 7D, respond speed is slow and an obvious peak exists in the curve of the temperature of the processor. On the contrary, the fan control method provided in this disclosure is more responsive and the overshoot of the temperature curve is less than the overshoot in the prior art.

FIGS. 7E and 7F are corresponding to low power consumption test. As shown in FIGS. 7E and 7F, the temperature curve obtained under the fan control method provided in this disclosure has shorter response time and smaller overshoot.

In view of the above description, this disclosure provides a fan control method, wherein a fan control signal is generated according to the maximum of a first pulse width modulation value and at least one second pulse width modulation value. The first pulse width modulation value relates to the power load and the temperature of the processor, and the second pulse width modulation value relates to the operation temperature of the other electronic component on the mother board. Thus, the fan control method provided in this disclosure is a combination of PID speed control and linear control. As a result, the method provided in this disclosure includes both the benefits of the PID speed control and linear control, excludes the problems of slow responding and power wasting, and thus is pragmatic.

What is claimed is:

1. A fan control method, adapted to a mother board having a processor electrically connected to a fan for cooling the mother board, comprising:

determining whether a processor power load value is larger than a load threshold, and generating a load determination result accordingly;

determining whether the processor temperature is not larger than a temperature threshold, and generating a temperature determination result accordingly;

choosing one set of PID coefficients from a plurality of sets of PID coefficients according to the load determination result and the temperature determination result, wherein the set of PID coefficients at least includes a portion coefficient and a corresponding integration coefficient;

obtaining a temperature difference value related to the processor, and determining whether the temperature difference value is less than a temperature difference threshold;

setting a first temperature difference threshold as the temperature difference threshold when the load determination is negative and the temperature determination is positive;

adjusting the temperature difference value to be the first temperature difference threshold when the temperature difference value is not less than the first temperature difference threshold;

setting a second temperature difference threshold as the temperature difference threshold when the load determination is negative and the temperature determination is negative;

adjusting the temperature difference value to be the second temperature difference threshold when the temperature difference value is not less than the second temperature difference threshold;

generating a first pulse width modulation value according to the adjusted temperature difference value and the set of PID coefficients; and receiving an operation temperature of an electronic component on the mother board, calculating a second pulse width modulation value corresponding to the operation temperature, and comparing the first pulse width modulation value with the second pulse width modulation value for obtaining a maximum of the first pulse width modulation value and the second pulse width modulation value to generate a fan control signal for controlling the fan.

2. The fan control method according to claim 1, further comprising setting a first constant as a value of the portion coefficient and setting a first integration value as a value of the integration coefficient according to the chosen set of PID coefficients when the load determination result is negative and the temperature determination result is positive; and setting a second constant as the portion coefficient according to the chosen set of PID coefficients and setting the first integration value as the integration coefficient when both the load determination result and the temperature determination result are negative;

wherein the first constant and the second constant are different.

3. The fan control method according to claim 1, comprising:

choosing a corresponding set from the sets of PID coefficients according to the temperature determination result and generating the first pulse width modulation value with computation thereby when the load determination result is positive.

4. The fan control method according to claim 1, comprising:

setting a second constant as a value of the portion coefficient according to the chosen set of PID coefficients and setting a first integration value as a value of the integration coefficient when the load determination is positive and the temperature determination is negative.

5. The fan control method according to claim 1, comprising:

setting a third constant as a value of the portion coefficient according to the chosen set of PID coefficients and setting a first integration value as a value of the integration coefficient when both the load determination result and the temperature determination result are positive.

6. The fan control method according to claim 4, wherein the fan control signal is a pulse modulation signal and the fan control method further comprises:
   generating a duty cycle increment according to the temperature difference value and the set of PID coefficients, wherein the duty cycle increment relates to a duty cycle of the fan control signal;
   determining whether a variation tendency of the processor load value is an increasing tendency according to a plurality of history value of the processor load value in a set-up time period;
   when the variation tendency is an increasing tendency and one of the duty cycle increments generated within the set-up time period is a negative value, removing the negative value among the duty cycle increments; and
   generating the first pulse width modulation value according to the duty cycle increments without the negative value.

7. The fan control method according to claim 5, wherein the fan control signal is a pulse modulation signal and the fan control method further comprises:
   generating a duty cycle increment according to the temperature difference value and the set of PID coefficients, wherein the duty cycle increment relates to a duty cycle of the fan control signal;
   determining whether a variation tendency of the processor load value is an increasing tendency according to a plurality of history value of the processor load value in a set-up time period;
   when the variation tendency is an increasing tendency and one of the duty cycle increments generated within the set-up time period is a negative value, removing the negative value among the duty cycle increments; and
   generating the first pulse width modulation value according to the duty cycle increments without the negative value.

8. The fan control method according to claim 1, wherein generating the first pulse width modulation value according to the temperature difference value and the set of PID coefficients comprises:
   generating a current pulse width modulation value according to the temperature difference value and the set of PID coefficients; and
   obtaining at least one history pulse width modulation value, and calculating an average of the at least one history pulse width modulation value and the current pulse width modulation value to generate the first pulse width modulation value.

* * * * *